United States Patent [19]

Stottmann et al.

[11] Patent Number: 4,507,105
[45] Date of Patent: Mar. 26, 1985

[54] BICYCLE CHAINGUARD

[75] Inventors: Richard L. Stottmann, Lima; Timothy J. Dietz, St. Marys, both of Ohio

[73] Assignee: Huffy Corporation, Miamisburg, Ohio

[21] Appl. No.: 448,091

[22] Filed: Dec. 9, 1982

[51] Int. Cl.³ .............................................. F16H 57/02
[52] U.S. Cl. ................................... 474/144; 403/191; 403/234; 403/344
[58] Field of Search ................ 474/144, 146; 403/191, 403/234, 386, 398, 400, 344; 248/229, 231.6; 24/68 TT, 69 TT, 69 AT, 68 C

[56] References Cited

U.S. PATENT DOCUMENTS

| 1,904,315 | 4/1933 | Kenway | 403/191 |
| 2,638,297 | 5/1953 | Weinberger | 248/229 |
| 3,505,761 | 4/1970 | Prieur | 248/229 |
| 3,843,083 | 10/1974 | Angibaud | 248/229 |

FOREIGN PATENT DOCUMENTS

| 425373 | 6/1911 | France | 474/146 |
| 274389 | 5/1930 | Italy | 474/146 |
| 585903 | 2/1947 | United Kingdom | 474/146 |

Primary Examiner—Stephen J. Novosad
Assistant Examiner—Mark J. DelSignore
Attorney, Agent, or Firm—Biebel, French & Nauman

[57] ABSTRACT

A bicycle chainguard having a housing shaped to enclose a bicycle chain and sized to extend about the front sprocket and pass rearwardly to the rear sprocket of a bicycle, at least one lug extending sidewardly from the housing having a shank and a head of larger cross-sectional area than the shank, a clamp having a flexible body sized to wrap around a portion of the bicycle frame adjacent the front sprocket and having opposing ends forming recesses so that the ends may be jointed to form a socket to receive the lug therein, and a clip to mount the housing to the upper rear of the frame. The socket preferably is sized to provide sufficient clearance with said lug to permit relative rotational movement therebetween so that the chainguard may be adjusted to be mounted to a variety of bicycle frames. The ends of the clamp may be secured by a screw and nut.

10 Claims, 8 Drawing Figures

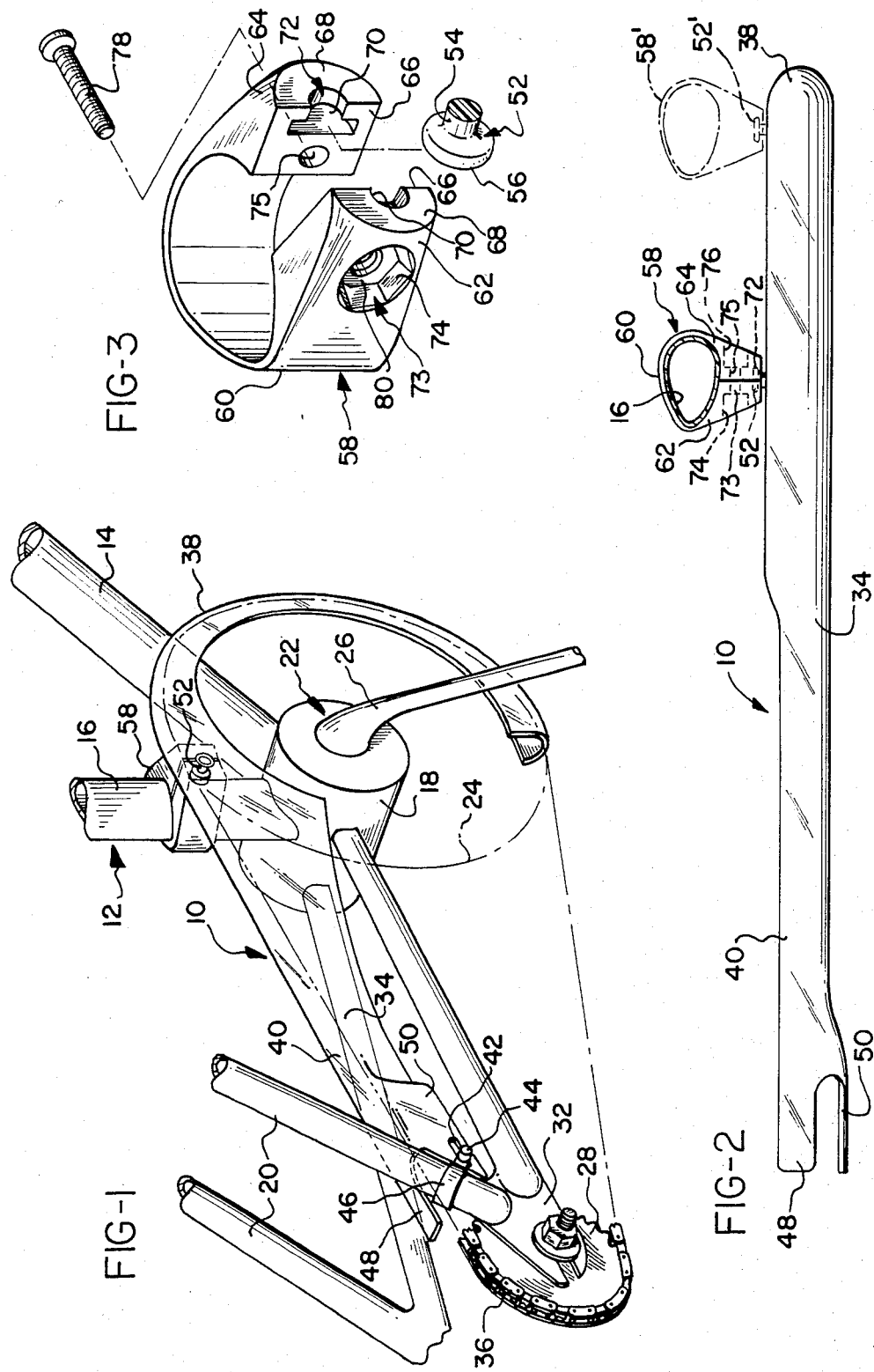

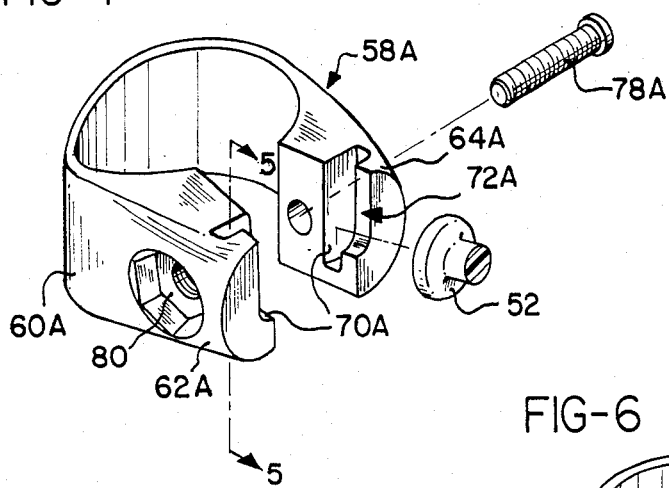
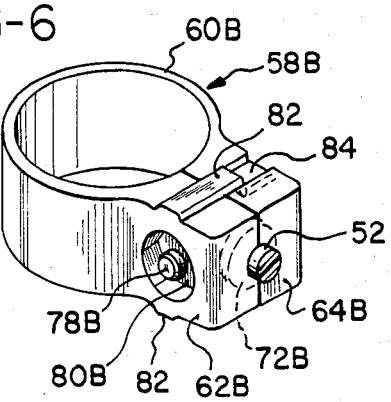
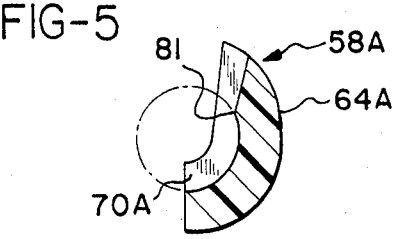
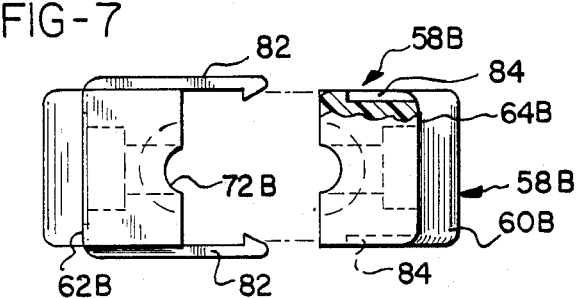
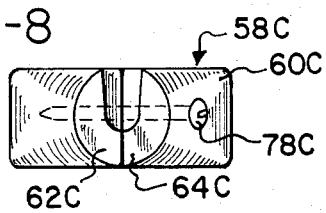

BICYCLE CHAINGUARD

BACKGROUND OF THE INVENTION

The present invention relates to chainguards for chain-and-sprocket driven vehicles and, more particularly, to chainguards for bicycles having a pedal-driven front drive sprocket and a rear driven sprocket.

Most bicycles, and many other pedal-driven vehicles, are of the type in which the user pedals a forward-mounted crank to rotate a drive sprocket linked by a chain to a driven sprocket mounted to the rear wheel of the vehicle. Many of these vehicles include some type of chainguard which encloses at least the portion of the loop of chain extending about the drive sprocket and to the driven sprocket to prevent foreign material from contacting the chain.

For bicycles, these chainguards typically are made of thin gauge metal and are attached at a rearward end thereof to the bicycle frame adjacent the rear driven sprocket, and at a forward end thereof to a bracket or brackets which may be welded to one or more of the down tube, crank housing, or seatmast of the bicycle frame. The chainguard includes mounting holes which are positioned in registry with holes formed in the mounting brackets welded to the bicycle frame, and the forward end of the chainguard is attached to the frame by bolts which are either threaded into the holes or are retained thereto by nuts.

A disadvantage of such a design is that such chainguards are limited in application only to those bicycle frames having mounting brackets with holes which correspond to the mounting holes of the chainguard. Another disadvantage is that the cost of fabricating the bicycle frames is increased by the expense of the labor and materials needed to attach or otherwise form mounting brackets on the bicycle frame. Since such mounting brackets are not movable once attached to the frame, should the brackets, or the frame members to which they are attached, be slightly out of tolerance, the bicycle frame will not accept an intended chainguard. Additional labor and expense would be required to reposition the brackets or frame members.

Accordingly, there is a need for a bicycle chainguard which is relatively inexpensive to fabricate and install and can be mounted to a relatively wide variety of frame sizes and styles. There is also a need for a chainguard which does not require the use of fixed mounting brackets to be attached to a bicycle frame. Furthermore, there is a need for a chainguard which can be mounted to a bicycle frame having one or more frame members which are slightly out of tolerance from the desired frame shape without necessitating the reworking or refabrication of the frame, chainguard, or mounting bracket.

SUMMARY OF THE INVENTION

The present invention provides a chainguard for a bicycle or the like which is relatively inexpensive to fabricate and install, yet is highly versatile and can be mounted to a variety of bicycle frame shapes and sizes without modification of the chainguard or frame. The chainguard is also adjustable to accommodate bicycle frames which are slightly out of tolerance from the frame as designed.

The present invention is a bicycle chainguard which includes a housing having a channel shape to enclose a bicycle chain and having a forward end sized to extend at least partially about a front sprocket and a rearward end sized to extend from the front sprocket to a rear sprocket of a bicycle, a clip for attaching the rearward end to the frame adjacent a rear sprocket, and a lug and clamp combination for attaching the forward end to a bicycle frame adjacent the front sprocket. The lug extends sidewardly from the front housing toward the frame and includes a shank and a head having a greater cross-sectional area than that of the shank.

The clamp includes a flexible, elongate body adapted to extend about a portion of a bicycle frame adjacent the front sprocket, typically the down tube or seatmast, and means such as a nut and bolt combination or a screw threaded directly into the flexible clamp to secure the ends of the body about the desired portion of the bicycle frame. The ends of the clamp body each have a mating surface and an end face. When the body is wrapped around the selected portion of the bicycle frame, the ends meet such that the mating surfaces engage each other and the end faces form a surface adjacent a portion of the forward end of the chainguard housing.

The mating and end faces of each end include a recess such that, when the ends of the clamp body are joined, the recesses form a socket which encloses and retains the head of the lug. In a preferred embodiment, the lug head and the socket part receiving the lug head are disk-shaped to permit relative rotational movement between the chainguard and the clamp. In one embodiment of the invention, the lug head is completely enclosed within the socket and cannot be removed without the separation of the ends of the clamp body. In another embodiment, the socket only partially encloses the lug head and provides an intereference fit therewith. With this embodiment, the lug head may be snapped into or out of the socket without requiring the separation of the ends of the clamp body.

Preferably, the lug is positioned on the housing to be adjacent either the down tube or seatmast of a typical bicycle frame. Since the clamp can be attached to the bicycle frame at any position along the length of either the down tube or seatmast, the chainguard can be mounted to a relatively wide variety of bicycle frames. In addition, the chainguard can be rotated about the lug to permit the rearward end to be brought to a position adjacent the upper rears of the frame to be attached thereto by a clip of standard design. Thus, the chainguard is adjustable to compensate for frames which are slightly out of tolerance and can be mounted to any one of a number of frames having varying seat tube angles. The chainguard may also include a second lug and clamp combination, positioned to attach the housing to the other of the down tube or seatmast. However, this second mounting point restricts somewhat the versatility of the chainguard.

Accordingly, it is an object of the present invention to provide a chainguard which is relatively inexpensive to fabricate and install and can be mounted to a relatively wide variety of bicycle frame geometries; which may be rotated about a forward axis of rotation to compensate for frames which are slightly out of tolerance; and which can be mounted to a bicycle frame without the use of brackets which are welded or otherwise formed on the bicycle frame.

Other objects and advantages of the invention will be apparent from the following description, the accompanying drawings and the appended claims.

BRIEF DESCRIPTION OF THE DRAWINGS

FIG. 1 is a perspective view of the chainguard of the present invention mounted to a portion of a bicycle frame;

FIG. 2 is a top view of the chainguard of FIG. 1 in which a second clamp is shown in phantom;

FIG. 3 is an exploded perspective view of the clamp of the chainguard of FIGS. 1 and 2;

FIG. 4 is an exploded perspective view of an alternate embodiment of the clamp of the present invention;

FIG. 5 is an elevation in section of the clamp of FIG. 4, taken at line 5—5 of FIG. 4;

FIG. 6 is a perspective view of another alternate embodiment of the clamp of the present invention; and FIG. 7 is an elevation of the clamp of FIG. 6 in which the clamp ends are separated from each other and one end is partially broken away.

FIG. 8 is an elevation of an alternate embodiment of the clamp of the present invention.

DESCRIPTION OF THE PREFERRED EMBODIMENTS

As shown in FIGS. 1 and 2, the bicycle chainguard of the present invention, generally designated 10, is adapted to be mounted to a bicycle frame 12 of standard design, typically including a down tube 14, seatmast 16, crank housing 18, and upper rears 20. A bicycle crank assembly 22, consisting of a front drive sprocket 24 (shown schematically) and pedal arms 26 supporting pedals (not shown), is mounted within the crank housing 18. A rear or driven sprocket 28 is mounted on a rear wheel (not shown) which is rotatably mounted to the frame 12 at a rear toe plate 32.

The chainguard 10 includes a housing 34 which preferably is molded of a rugged plastic material such as a polycarbonate. The housing 34 is generally channel-shaped in cross-section for most of its length and the channel shape is sized to enclose a sprocket chain 36 which extends about the front and rear sprockets 24,28, respectively. The housing 34 includes a forward end 38 which extends at least partially about the front sprocket, and a rearward end 40 which extends from the forward end to the rear sprocket 28.

The rearward end 40 includes a slot 42 which receives a hex-headed bolt 44 used to attach the rearward end 40 to a clip 46 of standard design. The clip 46 is shaped to fit about an upper rear 20 of the frame 12 and thus secure the rearward end 40 of the housing 34 to the frame adjacent the rear sprocket 28. Should the chainguard 10 be mounted to a bicycle frame (not shown) having a toe plate larger than the toe plate 32 shown in FIG. 1, the rearward end 40 could be attached directly to the toe plate by a screw. Other well-known methods of attaching the end 40 to a bicycle frame may be employed without departing from the scope of the invention.

The rearward end 40 of the housing 34 includes a tongue 48 which is shaped and positioned to extend between the adjacent upper rear 20 and the rear wheel above the rear sprocket 28. The rearward end 40 also includes an offset portion 50 which contains the slot 42 and fits around the outside of the adjacent upper rear 20 such that the rearward end 40 of the housing 34 extends substantially along the center line of the chain 36. This minimizes the likelihood of the housing 34 intefering with the travel of the chain.

A lug 52 (see FIG. 3) extends sidewardly from the forward end 38 of the housing 34 and preferably is positioned to be adjacent the seatmast 16 of the frame 12 when the housing is positioned for mounting about the front and rear sprockets 24,28. The lug includes a generally cylindrically-shaped shank 54 terminating in a disk-shaped head 56. The head has a cross-sectional area greater than that of the shank. The lug 52 preferably is molded integrally with the housing 34.

The chainguard 10 includes a clamp 58, shown in FIG. 1, 2 and 3, which captures the lug 52 and secures the forward end 38 of the housing 34 to the bicycle frame 12. As best shown in FIGS. 2 and 3, the clamp 58 includes a flexible body 60 which preferably is made from a tough, flexible material, such as nylon 6 or nylon 6/6. The body terminates in a pair of opposing ends 62,64. Each of the opposing ends 62,64 includes a mating surface 66 and an end face 68. Each of the mating and end faces 66,68 includes a recess 70 such that, when the ends 62,64 are joined, the recesses 70 form a socket 72 shaped to receive and retain the lug 52. The socket 72 preferably conforms to the contour of the lug 52 with a tolerance sufficiently loose to permit relative rotation.

As shown in FIGS. 2 and 3, end 62 includes a hole 73 having a countersink 74, and end 64 includes a hole 75 having a countersink 76. A screw 78 is inserted through the holes 73,75 and a hex nut 80 is inserted in countersink 74 to receive the shank of the screw, thereby joining the ends 62,64 of the body 60 together. The body 60 is shaped to form a loop having an inner contour which conforms with the cross-sectional profile of the seatmast 16 and/or down tube 14 when the ends 62,64 of the body are joined by the screw and nut 78,80.

Although the preferred embodiment of the chainguard 10 includes a single lug 52 and clamp 58 combination, which affords maximum adaptability of the chainguard to a bicycle frame, it may be desirable to include a second lug 52' which is secured to the down tube 14 (FIG. 1) by a second clamp 58'. Furthermore, the body 60 of a clamp 58 may also be formed such that the inner contour of the clamp formed when the ends 62,64 are brought together conforms to a shape different than the "teardrop" profile of the seatmast 16 shown in FIG. 2, without departing from the scope of the invention.

The chainguard 10 is attached to the frame 12 relatively easily. The clamp 58 is first bent around the seatmast 16 at a location adjacent the front sprocket 24, and the screw and nut 78,80 are threaded together to secure the ends 62,64 to each other loosely. The mating surfaces 66 of the opposing ends 62,64 face each other, and the end faces 68 form a substantially flat surface adjacent the housing 34 of the chainguard 10.

While the ends 62,64 are still somewhat separated, the chainguard housing 34 is positioned about the front sprocket 24 and chain 36, and lug 52 is fitted between the recesses 70 of the ends. The screw 78 is then tightened down on the hex nut 80, bringing the mating surfaces 66 together and retaining the lug 52 within the socket 72 formed by the recesses 70. Since the head 56 of the lug 52 is generally disk-shaped and the adjacent portion of the socket 72 is similarly shaped, the housing 34 may be rotated about an axis of rotation passing along the shank 54 of the lug so that the rearward end 40 of the housing may be properly positioned relative to the upper rears 20 and rear sprocket 28.

Before the screw 78 and nut 80 are tightened completely, the clamp 58 may be displaced upwardly or downwardly along the seatmast 16, as needed, to position the forward end 38 of the chainguard housing 34 properly relative to the front drive sprocket 24.

After the forward end 38 is positioned, and clamp 58 tightened, the rearward end 40 is attached to the upper rear 20 of the bicycle frame 12 by the clip 46 and bolt 44, which is passed through the slot 42. Additional flexibility is provided by the slot 42 which permits the chainguard 10 to be adjusted relative to the clip 46 and upper rear 20 or, as mentioned previously, to the toe plate of a frame.

A different embodiment of a clamp 58A is shown in FIGS. 4 and 5. The clamp 58A includes a body 60A having opposing ends 62A,64A, each defining a recess 70A. The recesses 70A are J-shaped such that the resultant socket 72A, formed when the ends of the clamp 58A are joined, provides a somewhat U-shaped recess having a constricted portion 81 which makes a snap or interference fit with an associated lug 52, while still permitting relative rotational movement. To use the clamp 58A to mount the housing 34, the clamp may be firmly secured to the seatmast 16 (FIG. 2) and the lug 52 of the chainguard snapped into engagement with it, without having to position the lug between the separated recess halves 72A as the screw 78A is tightened down on the hex nut 80A.

Another embodiment of the clamp 58B is shown in FIGS. 6 and 7. Clamp 58B includes a body 60B having an end 62B with prongs 82 and end 64B with mating slots 84. The clamp 58B is secured about a desired portion of a bicycle frame 12 (FIG. 1) by inserting the prongs 82 of end 62B into the sockets 84 of end 64B, thus holding the clamp in place and retaining the lug 52 within the socket 72B as the screw 78B and nut 80B are tightened.

As shown in FIG. 8, another form of a clamp 58C has a body 60C which includes opposing ends 62C,64C that do not have holes or countersinks formed therein for receiving a screw and nut, as does the body 60 of clamp 58 shown in FIG. 3. Rather, a self-tapping screw 78C is employed which is tapped directly through ends 62C,64C, thus securing them together. Of course, any of the aforementioned means for securing the ends of a clamp 58,58A,58B,58C together can be used with any one of the clamp body embodiments 60,60A,60B, without departing from the scope of the invention.

While the forms of apparatus herein described constitute preferred embodiments of this invention, it is to be understood that the invention is not limited to these precise forms of apparatus, and that changes may be made therein without departing from the scope of the invention.

What is claimed is:

1. A chainguard for a bicycle or the like comprising:
   a substantially channel-shaped housing for enclosing a length of bicycle chain engaging front and rear sprockets of a bicycle, and having a forward end curved to extend about a front sprocket and a rearward end sized to extend from a front sprocket to a rear sprocket;
   means for attaching said rearward end to a bicycle frame adjacent a rear sprocket;
   lug means extending sidewardly from said housing and positioned on said forward end to be adjacent a down tube and a seatmast of a bicycle frame to which said chainguard is mounted, said lug means including a shank and a substantially disk-shaped head;
   clamp means associated with said lug means for retaining said housing to a bicycle frame, each of said clamp means having a continuous, flexible body with opposing ends, each of said ends having a mating surface and an end face such that, when said body is bent to engage said mating ends, said body forms a loop having an inner contour shaped to conform to a profile of a predetermined portion of an associated bicycle frame;
   said mating surfaces and end faces of each of said bodies including a recess such that, when said ends of said body are engaged at said mating surfaces, said recesses form a substantially disk-shaped socket sized to enclose and retain said head with sufficient clearance to permit rotational movement of said lug means relative to said clamp about a central axis of said shank; and
   means for joining said ends of said clamp means such that said mating surfaces are engaged.

2. In a chainguard for a bicycle or the like of the type having a housing including a forward end sized to extend at least partially about a front sprocket and a rearward end sized to extend from a front sprocket to a rear sprocket of a bicycle, and means for attaching said rearward end to a bicycle frame adjacent a rear sprocket, the improvement comprising:
   said housing having a lug extending sidewardly from said forward end thereof, said lug having a shank and a head at an end thereof, said head having a larger diameter than said shank;
   a clamp having a continuous, flexible body adapted to be bent about a portion of a bicycle frame adjacent a front sprocket, said body having opposing ends, each of said ends having a mating surface and an end face;
   said mating surfaces and end faces of said ends forming a socket when said mating surfaces are in abutting relation, said socket being shaped to extend about and capture said head therein and having a diameter sufficient to allow rotation of said head and shank relative to said clamp about an axis extending along said shank, whereby said chainguard may be adjusted relative to an associated bicycle; and
   means for securing said ends of said body together such that said mating surfaces are in abutting relation.

3. The chainguard of claim 2 wherein said securing means includes a screw extending through said ends of said clamp, and a nut threaded on an end of said screw.

4. The chainguard of claim 2 wherein said head is disk-shaped, said shank is cylindrically-shaped and said socket is similarly shaped to permit rotation of said lug relative to said clamp.

5. The chainguard of claim 3 wherein said socket completely encloses said head retained therein such that said lug cannot be removed therefrom when said ends of said body are secured together.

6. The chainguard of claim 4 wherein said socket is substantially U-shaped and includes a constricted portion such that said head is partially enclosed thereby and is retained therein by an interference fit such that said lug may be inserted or removed from said clamp while said ends of said body are secured together.

7. The chainguard of claim 5 wherein said clamp is made of nylon.

8. The chainguard of claim 7 wherein said housing is made of a polycarbonate.

9. The chainguard of claim 8 wherein said clamp is shaped such that, when said ends of said body are secured together, an opening is formed by said body shaped to conform to a bicycle frame member having an eccentric shape in cross-section.

10. The chainguard of claim 9 wherein said housing is channel-shaped to enclose a bicycle chain.

* * * * *